(12) United States Patent
Yoo et al.

(10) Patent No.: US 6,198,714 B1
(45) Date of Patent: Mar. 6, 2001

(54) OPTICAL PICKUP HAVING AN OBJECTIVE LENS COMPATIBLE WITH A PLURALITY OF OPTICAL DISK FORMATS

(75) Inventors: Jang-hoon Yoo, Seoul; Chong-sam Chung, Sungnam; Chul-woo Lee, Seoul; Kun-ho Cho, Suwon, all of (KR)

(73) Assignee: Samsung Electronics Co., Ltd., Suwon (KR)

(*) Notice: Subject to any disclaimer, the term of this patent is extended or adjusted under 35 U.S.C. 154(b) by 0 days.

(21) Appl. No.: 09/505,155

(22) Filed: Feb. 15, 2000

Related U.S. Application Data

(62) Division of application No. 09/023,046, filed on Feb. 13, 1998, now Pat. No. 6,091,691
(60) Provisional application No. 60/039,663, filed on Feb. 28, 1997.

(30) Foreign Application Priority Data

Feb. 13, 1997 (KR) ..................................... 97-4273

(51) Int. Cl.[7] ...................................................... G11B 7/00
(52) U.S. Cl. .............................................. 369/112; 369/58
(58) Field of Search .................................. 369/112, 110, 369/58, 54, 118, 94, 44.12, 44.23

(56) References Cited

U.S. PATENT DOCUMENTS 5,661,711 * 8/1997 Tanaka et al. ....................... 369/112

FOREIGN PATENT DOCUMENTS

| | | |
|---|---|---|
| 293121 | 12/1996 | (CH) . |
| 0 731 458 A1 | 9/1996 | (EP) . |
| 0 742 554 A2 | 11/1996 | (EP) . |
| 0 776 004 A2 | 5/1997 | (EP) . |
| 0 838 812 A2 | 4/1998 | (EP) . |
| 5-81693 | 4/1993 | (JP) . |
| 6-20291 | 1/1994 | (JP) . |
| 6-215406 | 8/1994 | (JP) . |
| 6-325404 | 11/1994 | (JP) . |
| 6-325405 | 11/1994 | (JP) . |
| 7-98431 | 4/1995 | (JP) . |
| 07302437 | 11/1995 | (JP) . |
| 7-302437 | 11/1995 | (JP) . |
| 7-311945 | 11/1995 | (JP) . |
| 8-55363 | 2/1996 | (JP) . |
| 8-203115 | 8/1996 | (JP) . |
| 8-263869 | 10/1996 | (JP) . |

* cited by examiner

Primary Examiner—Paul W. Huber
(74) Attorney, Agent, or Firm—Staas & Halsey LLP

(57) ABSTRACT

An optical pickup compatible with a plurality of optical recording media each using light of a different wavelength. The optical pickup includes at least one light source, an objective lens having a function of focusing light emitted from the light source into the optimal light spot on an information recording surface of one of the plurality of the optical recording media, and a light detector to detect light transmitted through the objective lens after being reflected from the information recording surface of the optical recording medium on which the light spot is formed. The objective lens has an inner area, an annular lens area and an outer area such that the annular lens area divides the inner area from the outer area and has a ring shape centered at a vertex. The inner area, the annular lens area and the outer area have aspherical surface shapes to focus light transmitted through the inner area and the outer area into a single light spot by which information can be read from the information recording surface of a relatively thin first optical recording medium and scatter light transmitted through the annular lens area located between the inner area and the outer area so that information cannot be read from the information recording surface of the first optical recording medium, during reproduction of the first optical recording medium. The inner area and the annular lens area transmit light into a single light spot by which information can be read from the information recording surface of a relatively thick second optical recording medium and scatters light transmitted through the outer lens area so that information cannot be read from the information recording surface of the second optical recording medium, during reproduction of the second optical recording medium.

19 Claims, 12 Drawing Sheets

LONGITUDINAL
SPHERICAL ABERRATION

WAVEFRONT
ABERRATION($\lambda$ rms)

OPTICAL PICKUP HAVING AN OBJECTIVE LENS COMPATIBLE WITH A PLURALITY OF OPTICAL DISK FORMATS

This application is a divisional of application number 09/023,046, filed Feb. 13, 1998, now U.S. Pat. No. 6,091,691 issued Jul. 18, 2000 which claims benefit of provisional application Pat. No. 60,039,663, filed Feb. 28, 1997,

BACKGROUND OF THE INVENTION

1. Field of the Invention

The present invention relates to an optical pickup including an objective lens having a function of forming an optical spot on an information recording surface of optical recording media of different formats, and more particularly, to an optical pickup having an objective lens which is compatibly used in a plurality of optical disks each having a different format, such as a digital versatile disk (DVD), a CD-Recordable (CD-R), CD-Rewritable (CD-RW), a Compact Disc (CD) and a Laser Disk (LD).

2. Description of the Related Art

A recording medium for recording and reproducing information such as video, audio or data at high density, is a disk, a card or a tape. However, a disk-type recording medium is primarily used. Recently, an optical disk system has been developed in the form of an LD, a CD and a DVD. However, when optical disks having respectively different formats, such as DVD, CD-R, CD, CD-RW and LD, are compatibly used, optical aberration occurs due to the variation of disk thickness and wavelength. Thus, an optical pickup which is compatible with the different formats of the disks as well as removes the above-mentioned optical aberration has been actively studied. In the result of such a study, optical pickups which are compatible to the different formats have been fabricated.

FIGS. 1A and 1B show a part of a conventional optical pickup which is compatible with different formats. FIG. 1A shows a case where light is focused on a thin optical disk and FIG. 1B is a case where light is focused on a thick optical disk. In FIGS. 1A and 1B, a reference numeral 1 denotes a hologram lens. 2 denotes a refractive objective lens, 3a denotes a thin optical disk, and 3b denotes a thick optical disk. Light 4 output from an unshown light source is diffracted by a grating (lattice) pattern 11 of the hologram lens 1, to accordingly generate non-diffracted zero-order light 40 and diffracted first-order light 41, respectively. The non-diffracted zero-order light 40 is focused on an information recording surface of an optical disk 3a by the objective lens 2. The diffracted first-order light 41 is focused on an information recording surface of an optical disk 3b by the objective lens 2. Therefore, the optical pickup shown in FIGS. 1A and 1B uses the non-diffracted zero-order light 40 and the diffracted first-order light 41 to record information on or read the information from the optical disks 3a and 3b of the different thicknesses, respectively.

Another conventional technology is disclosed in Japanese Patent Laid-open Publication No. Heisei 7-302437, published on Nov. 14, 1995. An objective lens of an optical head apparatus disclosed in the above publication has, from the center of the objective lens, an odd-numbered region(s) having a focal point congruent with an information recording surface of a thin optical disk, and an even-numbered region(s) having a focal point congruent with an information recording surface of a thick optical disk. Thus, in the case of the thin optical disk, light transmitted through the odd-numbered region(s) of the objective lens is used to read information from the thin optical disk. Also, in the case of the thick optical disk, light transmitted through the even-numbered region(s) of the objective lens is used to read information from the thick optical disk.

However, since the optical pickup shown in FIGS. 1A and 1B divides the incident light into zero order light and first order light, the efficiency of a light use efficiency is lowered. That is, since the incident light is divided into zero order light and first order light by the hologram lens 1, only the zero-order light or the first-order light is used to record the information on or read the information from the optical disk, and the optical pickup uses only 15% or so of the incident light, to thereby lower the light use efficiency. Also, according to the thickness of the used optical disk, only one of the zero-order light and the first-order light reflected from the corresponding optical disk 3a or 3b contains actually read information. Thus, the light having no information functions as noise in a light detection operation with respect to the light containing information. The above problem can be overcome by processing the hologram lens 1 of the lens device. However, when working the hologram lens 1, an etching process for producing a fine hologram pattern requires a high precision. Thus, the manufacturing cost increases.

In the case of the prior art disclosed in the Japanese Patent Laid-open Publication No. Heisei 7-302437, the light transmitted through only one of the odd-numbered region(s) and the even-numbered region(s) is used. As a result, the light use efficiency is lowered. Also, since the number of the focal points is always two, the light having no information functions as noise during the light detection, which makes it difficult to detect information from the light reflected from the optical disk.

SUMMARY OF THE INVENTION

To solve the above problem, it is an object of the present invention to provide an optical pickup which has an excellent signal detection function independent of a disk format thereof.

It is another object of the present invention to provide an objective lens which compatibly is used with at least two substrates having respectively different thicknesses.

Additional objects and advantages of the invention will be set forth in part in the description which follows and, in part, will be obvious from the description, or may be learned by practice of the invention.

The above and other objects of the present invention are achieved by providing an optical pickup which is compatible with a plurality of optical recording media, the optical pickup including at least one light source, an objective lens having a function of focusing light emitted from the light source into an optimal light spot on an information recording surface of one of the plurality of the optical recording media, and a light detector to detect light transmitted through the objective lens after being reflected from the information recording surface of the optical recording medium on which the light spot is focused. The objective lens has an inner area, an annular lens area and an outer area which are divided by an annular lens area in a ring form centered at a vertex, wherein the inner area, the annular lens area and the outer area have aspherical surface shapes for focusing light transmitted through the inner area and the outer area into a single light spot by which information can be read from the information recording surface of a relatively thin first optical recording medium and scattered light transmitted through the annular lens area located between the inner area and the outer area cannot be focused on the first optical recording medium during reproduction of the first optical recording medium having a thin substrate. The objective lens focuses light transmitted through the inner area and the annular lens area into a single light spot by which information can be read from the information recording surface of a relatively thick second optical recording medium and scattered light transmitted through the outer area cannot be focused on the second optical recording medium having a thick substrate, during reproduction of the second optical recording medium.

The above and other objects may further be achieved by providing an objective lens which uses at least two substrates having respectively different thicknesses to use light, the objective lens including an inner area, an annular lens area and an outer area which are divided by an annular lens area in a ring form centered at a vertex, wherein the inner area and the outer area have aspherical surface shapes for focusing light transmitted through the inner area and the outer area into a single light spot by which information can be read from the information recording surface of a relatively thin first substrate. The annular lens area has another aspherical surface shape for scattering light transmitted through the annular lens area and is located between the inner area and the outer area so that the transmitted light cannot be focused on the first substrate with the thinner thickness. The objective lens focuses light transmitted through the inner area and the annular lens area into a single light spot by which information can be read from the information recording surface of a relatively thick second substrate and scatters light transmitted through the outer area so that the transmitted light cannot be focused on the second substrate with the thick thickness.

BRIEF DESCRIPTION OF THE DRAWINGS

These and other objects and advantages of the invention will become apparent and more readily appreciated from the following description of the preferred embodiments, taken in conjunction with the accompanying drawings of which.

DETAILED DESCRIPTION OF THE PREFERRED EMBODIMENTS

Figure 1A:
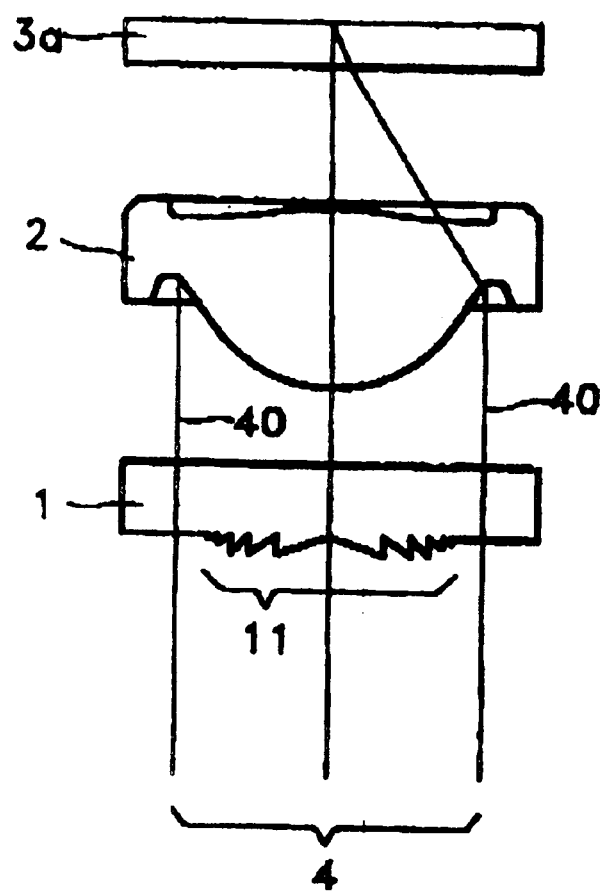
FIGS. 1A and 1B show a conventional optical pickup having a hologram lens and a refractive objective lens.
Figure 1B:
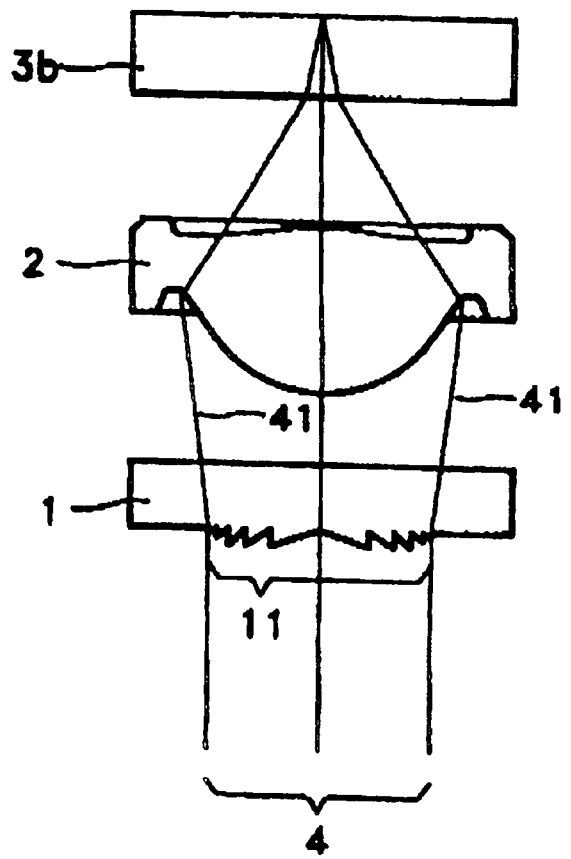

Reference will now made in detail to the present preferred embodiments of the present invention, examples of which are illustrated in the accompanying drawings, wherein like reference numerals refer to the like elements throughout. The embodiments are described below in order to explain the present invention by referring to the figures.

Figure 2A:
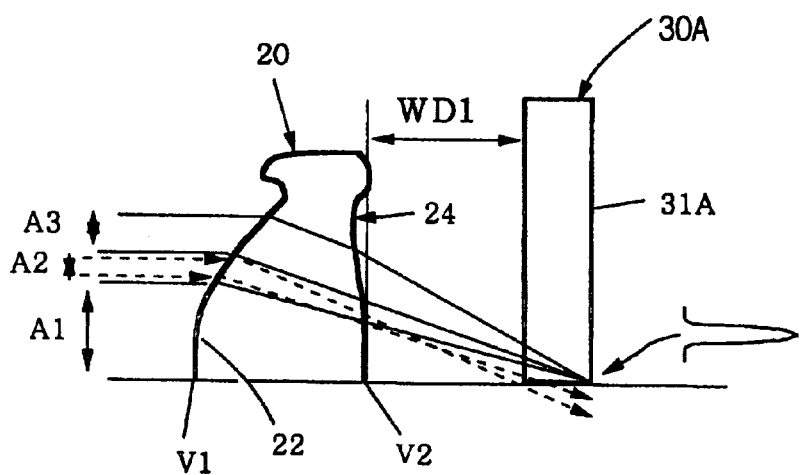
FIG. 2A shows that an objective lens according to first and second embodiments of the present invention forms an optical spot on an information recording surface of a thin optical disk.
Figure 2B:
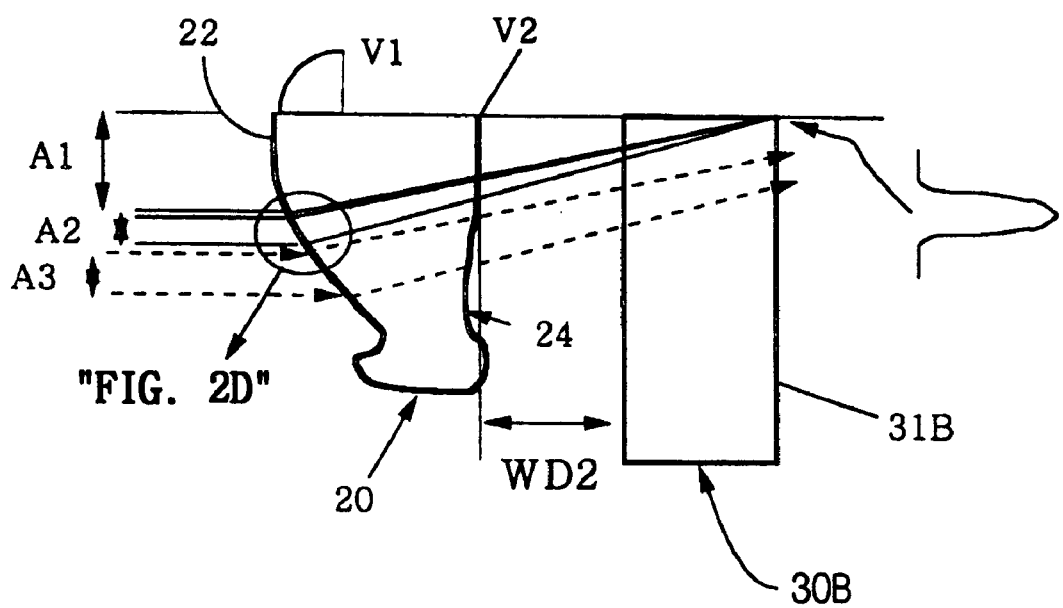
FIG. 2B shows that the objective lens according to the first and second embodiments of the present invention forms an optical spot on an information recording surface of a thick optical disk.
Figure 2C:
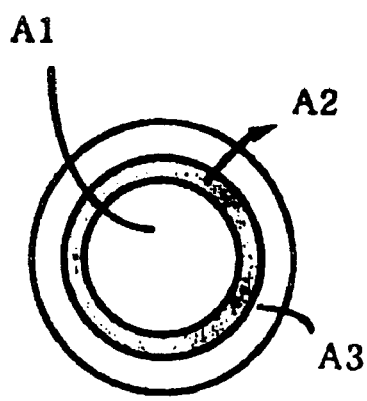
FIG. 2C shows an objective lens according to the first and second embodiments of the present invention as viewed from a light source, which shows sections of an inner area, an annular lens area and an outer area of the objective lens.
Figure 2D:
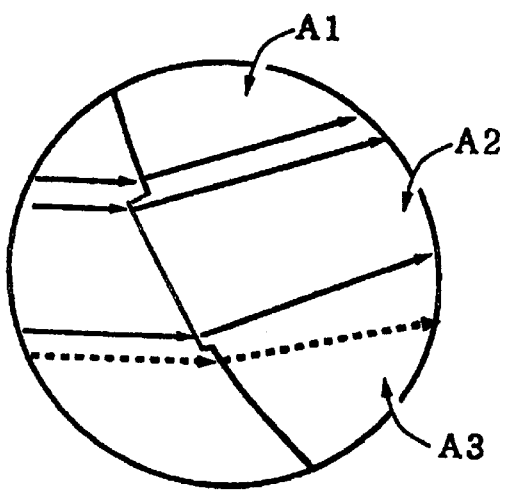
FIG. 2D shows an enlarged annular lens area portion of an ideal annular lens of the present invention.

FIG. 2A through 2D show an objective lens according to the present invention. FIG. 2A shows optical paths when a working distance of the objective lens 20 is "WD1" during readout of a thin optical disk 30A. FIG. 2B shows optical paths when a working distance of the objective lens 20 is "WD2" during readout of a thick optical disk 30B. FIG. 2C shows an objective lens 20 viewed from a light source, which shows that a lens surface 22 lying in the light source side of the objective lens 20 is divided into an inner area (central region) A1, an annular lens area (intermediate region) A2 and an outer area (periphery region) A3. FIG. 2D is an enlarged view of the portion of the annular lens area A2 of the objective lens 20, where the objective lens 20 is ideally manufactured.

In the objective lens 20 according to the first embodiment of the present invention, the lens surface 22 which lies in the light source side of the objective lens 20 is divided into the inner area A1, the annular lens area A2 and the outer area A3, by the annular lens area A2 having a ring form such as an elliptical or circular shape with a vertex V1 of the lens surface 22 in the center. Here, the vertex V1 is a point where the axis of the objective lens 20 intersects the lens surface 22 of the light source side. The inner area A1 and the outer area A3 have aspherical surface shapes which are optimized to form a best focal point on the information recording surface 31A of the thin optical disk 30A. Also, the inner area A1 is fabricated to generate a little spherical aberration on the information recording surface 31B of the thick optical disk 30B, but to have a sufficiently small spherical aberration for readout of the thick optical disk 30B. Particularly, the inner area A1 has a numerical aperture NA meeting the following relationship 1 to provide an optimized optical spot for reproducing the thick optical disk 30B such as an existing CD. The inner area A1, annular lens area A2, and outer area A3 respectively correspond to a near axis region, an intermediate axis region and a far axis region of incident light.

When light of 650 nm wavelength is used, it is preferable that the numerical aperture NA of the objective lens 20 is 0.37 or more to reproduce the existing CD.

$$0.8\lambda/NA \sim \text{spot size} \tag{1}$$

Here, λ represents the wavelength of the light, and NA represents the numerical aperture of the inner area A1. Assuming that a working distance of the objective lens 20 is "WD1" where the best focal point is formed by the inner area A1 and the outer area A3, the light (rays) transmitted through the inner area A1 and the outer area A3 form the optimal spot on the information recording surface 31A of the thin optical disk 30A with respect to the working distance "WD1" and do not generate spherical aberration. Also, when the light transmitted through the inner area A1 of the objective lens 20 is used, the existing optical disk 30B such as a relatively thick CD is reproduced. This technology has been disclosed in Korean patent application No. 96-3605. However, a numerical aperture not less than 0.4 is required to reproduce an optical disk which uses a smaller sized spot such as an LD among the existing optical disks. To make a large NA above 0.37, when the annular lens area A2 has an aspherical surface extending the aspherical surface shape of the inner area A1, the light transmitted through the annular lens area A2 during reproduction of the LD generates a larger optical aberration to such a degree that the LD cannot be reproduced. Therefore, the annular lens area A2 corrects such optical aberration, and has an aspherical surface shape by which the light transmitted through the annular lens area A2 corrects the optical aberration at a best position where a focal point is formed by the inner area A1.

FIG. 2B shows an optical path during reproduction of the thick optical disk 30B, and shows that the light transmitted through the outer area A3 does not form a spot on the optical disk and is scattered and the light transmitted through the areas A1 and A2 are focused on the thick disk surface 31D. Meanwhile, when the working distance of the objective lens 20 is "WD1," the light transmitted through the annular lens area A2 is scattered at the information recording surface 31A of the optical disk 30A. The solid lines in FIG. 2A show the optical paths of the light transmitted through the inner area A1 and the outer area A3 when the working distance is "WD1." The dotted line shows the optical path of the light transmitted through the annular lens area A2 in which the light is scattered.

Figure 3A:
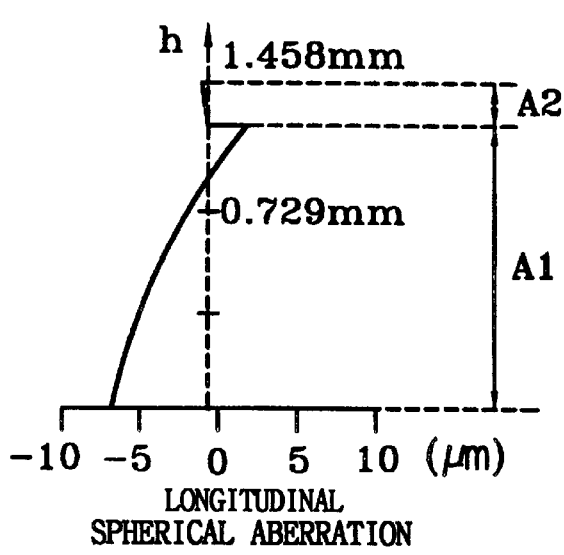
FIG. 3A shows longitudinal spherical aberration of the objective lens according to the first embodiment of the present invention during readout of a thick optical medium.

FIG. 3A is a graph showing aberration for explaining a working distance and optical longitudinal spherical aberration of the objective lens 20 during readout of a thick optical disk 30B. Since the inner area A1 has spherical aberration when the objective lens 20 reproduces the thick optical disk 30B, the objective lens 20 is optically defocused, that is, the working distance is adjusted, to thereby have a minimal value of the optical aberration. A spherical aberration coefficient $W_{40}$ produced due to the difference of a disk thickness between the thin optical disk 30A and the thick optical disk 30B meets the following equation 2.

$$W_{40} = \frac{n^2-1}{8n^3} d(NA)^4 \approx 0.6 \, \mu m \tag{2}$$

Generally, the optical aberration including spherical aberration is expressed as the following equation (3).

$$W = W_{20}h^2 + W_{40}h^4 \tag{3}$$

Here, $W_{20}$ is a defocus coefficient and h is a marginal (light) ray height.

The square root of the optical aberration meets the following equation 4.

$$\sigma_W^2 = \sqrt{\overline{W^2} - (\overline{W})^2} = \frac{1}{12}[W_{20} + W_{40}]^2 + \frac{1}{180}W_{40}^2 \tag{4}$$

Here, $\overline{W^2} = \frac{1}{3}W_{20}^2 + \frac{1}{2}W_{20}W_{40} + \frac{1}{5}W_{40}^2$, $\overline{W} = \frac{1}{2}W_{20} + \frac{1}{3}W_{40}$ Therefore, the condition of the defocus coefficient which minimizes the optical aberration is $W_{20} = -W_{40}$, and the actual defocus amount complies with the following equation (5).

$$\Delta Z = -\frac{2W_{40}}{(NA)^2} \approx -8.3 \, \mu m \tag{5}$$

Here, the variation of the numerical aperture (NA) of the inner area, the disk refractive index (n) and the disk thickness (d) are as follows: NA=0.38, n=1.58 and d=0.6 mm. If the annular lens area A2 is designed so that a best spot is formed and spherical aberration does not occur with respect to the thick optical disk 30B being defocused by 8.3 μm, the longitudinal spherical aberration graph as shown in FIG. 3A can be obtained. In this case, the difference between a focal length formed by the inner area A1 and a focal length formed by the annular lens area A2 becomes 8.3 μm owing to the defocus amount of 8.3 μm at the optical axis. And the focal length is 3.3025 mm for the inner area A1 and 3.3111 mm for the annular lens area A2 according to the calculation by a commercial program (s/w) for optics. The 8.3 μm is a result from a third order calculation by hand, but 8.6 μcm is a result from a high order calculation including the third order by using the optical (s/w) program.

If the working distance of the objective lens 20 is changed from "WD1" to "WD2" which makes the optical aberration by the light transmitted through the annular lens area A2 into substantially zero, the light transmitted through the annular lens area A2 forms the optical path shown as the solid lines in FIG. 2B, and forms the optimal spot on the information recording surface 31B of the thick optical disk 30B. When the working distance "WD2" is the optimal working distance for reproduction of the thick optical disk 30B, the annular lens area A2 increases efficiency of utilization of the light used and increases the numerical aperture as well. In this case, the inner area A1 maintains spherical aberration which is sufficiently small for reproduction of the thick optical disk 30B. The spherical aberration generated by the inner area A1 is minimized and total wavefront aberration is about 0.07 λrms. Thus, the light transmitted through the inner area A1 and the annular lens area A2 forms a spot having a reduced size of 15% or more without increasing the optical aberration on the information recording surface 31B of the thick optical disk 30B, as compared with a case when the annular lens area A2 has the same aspherical surface shape as that of the inner area A1. Thus, it is possible to reproduce an optical recording medium such as an existing LD requiring a high density, as well as a CD. In this case, the light transmitted through the outer area A3 is scattered and does not influence the optical spot formed on the information recording surface 31B of the thick optical disk 30B. The optical path of the light transmitted through the outer area A3 is shown as the dotted lines in FIG. 2B. Thus, a single optical spot can be formed on the information recording surface 31B. Examples of the working distances described above and shown in FIGS. 2A and 2B are WD1= 1.897 mm and WD2=1.525 mm.

When the recorded information is read, the thin optical disk 30A uses the light of the relatively short wavelength, while the thick optical disk 30B uses both the light of the short wavelength and the relatively long wavelength. Therefore, when the thin optical disk 30A is a DVD and the thick optical disk 30B is a CD, an LD, CD RW or a CD-R, the inner area A1 and the outer area A3 have the aspherical surface shapes optimized to the information recording surface of the DVD, and the inner area A1 and the annular lens area A2 have the aspherical surface shapes where aberration is corrected and the working distance is optimized so that the information can be reproduced with respect to the information recording surface of the CD, the LD, CD RW or the CD-R. The annular lens area A2 among the areas A1, A2 and A3 has an aspherical surface shape determined by the following equation (6) expressing the aspherical surface.

$$Z(h) = \frac{h^2/R}{1+\sqrt{1-(1+K)h^2/R^2}} + Ah^4 + Bh^6 + Ch^8 + Dh^{10} + Z_{offset}$$

In the above equation (6), a function "Z" is a distance from the surface perpendicular to the optical axis and passing through the vertex V1 of the objective lens 20 to the lens surface 22 lying on the light source side of the objective lens 20. A variable "h" is a distance from the axis of the objective lens 20 to a particular point perpendicular to the axis. A constant "R" is a curvature which becomes a reference to determine an aspherical surface shape. $Z_{offset}$ is a parameter which is newly introduced to express a step difference between the annular lens area A2 and the inner area A1. Since the equation (6) is well known to a person who has an ordinary skill in the art, a detailed description thereof will be omitted. The annular lens area A2 has a protruded shape or a recessed shape when compared with the inner area A1 and the outer area A3. The annular lens area A2 of the protruded shape is enlarged and shown in FIG. 2D. The aspherical surface shapes possessed by the inner area A1 and the outer area A3 can be expressed by removing the offset component $Z_{offset}$ in the equation (6). The width of the annular lens area A2 is determined to provide the spot optimized for reproducing the relatively thick optical disk, and occupies at least 10% of an incident surface 22 of the objective lens 20 to which the light is incident from the light source. In case of a quantitative expression, the width of the annular lens area A2 has a range between about 100 and 300 μm.

The data obtained to provide the optimal aspherical surface shapes to the areas A1, A2 and A3 is represented in the following table.

TABLE

| LENS SURFACE | CURVATURE | ASPHERICAL SURFACE COEFFICIENT | THICKNESS | REFRACTIVE INDEX |
|---|---|---|---|---|
| INNER AREA (A1)/ OUTER AREA (A3) | 2.13482 | K: −0.425667<br>A: −0.822095E-03<br>B: −0.249645E-03<br>C: −0.106803E-03<br>D: −0.194864E-03 | 1.795 | 1.5864 |
| ANNULAR LENS AREA (A2) | 2.14101 | $Z_{offset}$: 0.0<br>K: −0.425667<br>A: −0.362745E-03<br>B: −0.259541E-03<br>C: −0.665620E-03<br>D: −0.620804E-03<br>$Z_{offset}$: −0.0012 | 1.795 | 1.5864 |
| LENS SURFACE (24) TOWARD OPTICAL DISK | −14.39337 | K: 8.578602<br>A: 0.897734E-02<br>B: −0.341346E-02<br>C: −0.762226E-03<br>D: −0.665163E-04 | | |
| OPTICAL DISK | 0 | | 1.2/0.6 | 1.58 |

Figure 4:
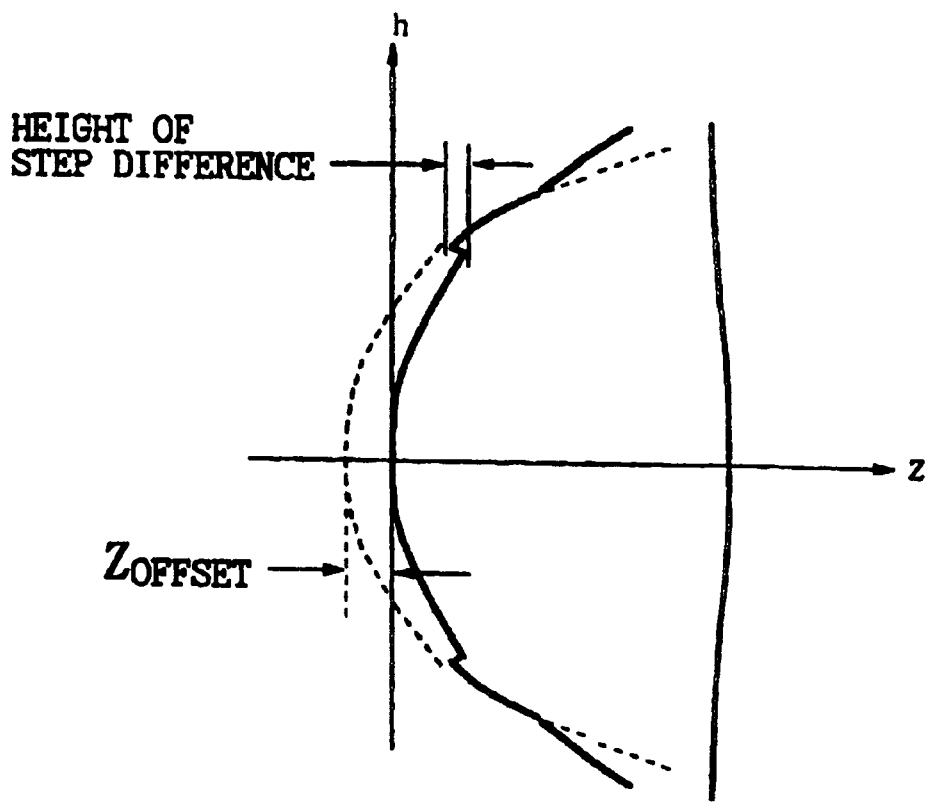
FIG. 4 shows an objective lens according to the first embodiment of the present invention.

When the aspherical surface shapes of the areas A1, A2 and A3 are determined by the equation (6) and the above Table, the imaginary surface which extends from the aspherical surface of the annular lens area A2 expressed as the dotted line in FIG. 4 becomes farther than the aspherical surface of the inner area A1 from the vertex V1 of the objective lens 20.

However, to easily form the areas A1, A2 and A3 of the aspherical surface shapes on the lens surface lying on the light source side, it is preferable that the annular lens area A2 is worked after working the inner area A1 and the outer area A3 primarily. Thus, the ring-shaped annular lens area A2 has a step difference at a region of contact with the inner area A1 contacts or the outer area A3.

Figure 3B:
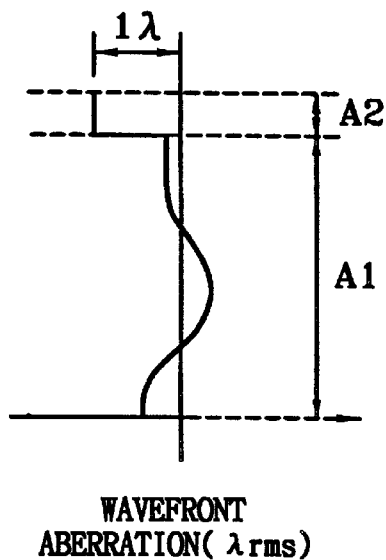
FIG. 3B shows wavefront aberration of the objective lens according to the first embodiment of the present invention during readout of a thick optical medium.
Figure 5:
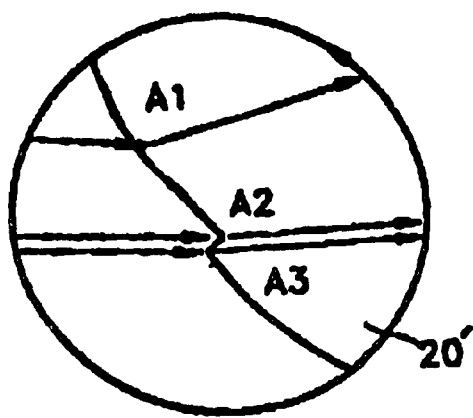
FIG. 5 shows an enlarged annular lens portion of the objective lens according to the second embodiment of the present invention.

FIG. 4 shows an objective lens 20 which is worked so that a step difference exists in a region where the inner area A1 contacts the annular lens area A2. FIG. 5 shows an objective lens 20' which is worked so that a step difference exists in a region where the annular lens area A2 contacts the outer area A3. Such step differences generate aberration due to a light path difference between the light passing through the inner area A1 and the annular lens area A2. The step differences have a height by which optical aberration due to the light path difference between the light passing through the inner area A1 and the annular lens area A2 can be removed with respect to the light of a relatively long wavelength emitted from the light source or the light for reproduction of the thick optical disk. Particularly, the height of the step difference is determined so that a light path difference between the light transmitted through the annular lens area A2 and the light transmitted through the inner area A1 of the objective lens 20 becomes an integer multiple of the wavelength of the used light as shown in FIG. 3B. The step difference height is determined to be a value by which the optical aberration due to the light path difference can be removed by taking the offset $Z_{offset}$ in the equation (6) and the width of the annular lens area A2 into consideration. Preferably, the step difference height is below 1.5 m according to the refractive index of the objective lens.

Figure 6:
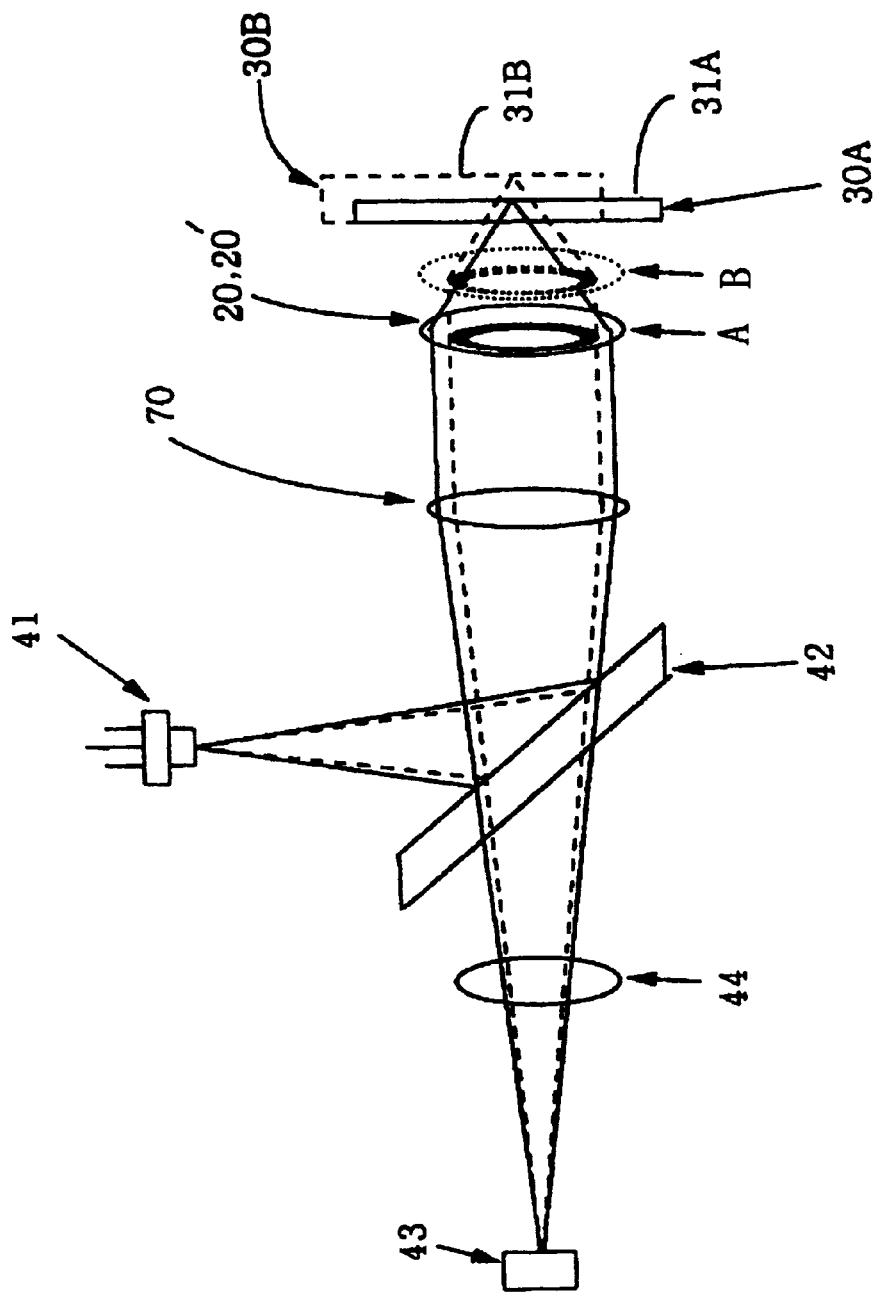
FIG. 6 shows a first type optical system of an optical pickup having a single light source adopting an objective lens according to the first and second embodiments of the present invention.

FIG. 6 shows a first type of optical pickup having a single light source adopting an objective lens 20 or 20' according to the first and second embodiments of the present invention. The optical pickup shown in FIG. 6 has a typical optical system, which is compatible with optical disks of various different formats using the identical wavelength of light, by using the objective lens 20 or 20' according to the first and second embodiments of the present invention. The optical source 41 emits the laser beam of a particular wavelength. A light detector 43 is designed so that the light transmitted through the outer area A3 of the objective lens 20 or 20' is not detected during reproduction of the thick optical disk 30B. That is, the light detector 43 is designed so that only the light transmitted through the inner area A1 and the annular lens area A2 of the objective lens 20 or 20' is detected during reproduction of information from the thick optical disk 30B.

For clarity, a case where the optical pickup of FIG. 6 includes the objective lens 20 or 20' and the optical source 41 emits the light of 650 nm wavelength will be described. The (light) rays of 650 nm wavelength emitted from the light source 41 are reflected from a beam splitter 42. The beam splitter 42 reflects about 50% of the incident light and the reflected rays become substantially parallel by a collimating lens 70. Since the (light) rays incident from the light source 41 toward the objective lens 20 or 20' can be made into substantially parallel light using the collimating lens 70, a more stable read operation can be performed. When a reproduction operation with respect to a thin disk 30A, for example, a DVD is performed, the (light) rays transmitted through the collimating lens 70 are focused in the form of a beam spot on an information recording surface 31A of the thin disk 30A by the objective lens 20 or 20'. In this case, the objective lens 20 or 20' has a working distance "WD1" and is shown as a solid line in FIG. 6 at position A. Therefore, the rays of 650 nm wavelength form a light path shown as the solid line in FIG. 6. The light reflected from the information recording surface 31A of the thin disk 30A is transmitted through the objective lens 20 or 20' and the collimating lens 70, and then is incident on the beam splitter 42. The beam splitter 42 transmits about 50% of the incident light and the transmitted light is focused into the light detector 43 by a light detection lens 44. Here, the light transmitted through the inner area A1 and the outer area A3 of the objective lens 20 or 20' forms a spot of a particular size on the information recording surface 31A of the thin disk 30A, by which information can be read from the information recording surface 31A of the thin disk 30A. Meanwhile, the light transmitted through the annular lens area A2 of the objective lens 20 or 20' forms a band in a scattered form at a position deviated by about 5 $\mu$m on the thin disk 30A from the position of the spot formed by the light transmitted through the inner area A1 and the outer area A3. Thus, the light transmitted through the annular lens area A2 is not detected by the light detector 43 and does not function as noise with respect to an effective reproduction signal during reproduction of data from the thin disk 30A.

When a reproduction operation with respect to a thick disk 30B, for example, a CD or LD, is performed, the light transmitted through the collimating lens 70 is focused in the form of a beam spot on an information recording surface 31B of the thick disk 30B by the objective lens 20 or 20' at position B. In this case, the objective lens 20 or 20' has a working distance "WD2" and is shown as a dotted line in FIG. 6. Therefore, the light forms an optical path shown as the dotted line in FIG. 6. Here, the light transmitted through the inner area A1 and the annular lens area A2 of the objective lens 20 or 20' forms a spot of a size on the information recording surface 31B of the thick disk 30B, by which information can be read from the information recording surface 31B of the thick disk 30B. Meanwhile, the light transmitted through the outer area A3 of the objective lens 20 or 20' forms a spot having a relatively weak intensity and lying at a position deviated from the position of the spot formed by the light transmitted through the inner area A1 and the annular lens area A2. Thus, the light detector 43 can read information from the thick disk 30B using the light transmitted through the inner area A1 and the annular lens area A2 of the objective lens 20 or 20'.

In more detail, the light transmitted through the inner area A1 generates spherical aberration on the information recording surface 31B of the thick disk 30B. However, the spherical aberration has a sufficiently small amount to read the signal from the thick disk 30B and the minimized optical aberration is maintained by defocusing the light by the amount of the spherical aberration at the optical axis. The lens curvature and an aspherical surface coefficient of the annular lens area A2 are corrected for a non-aberration optical system at the state where the working distance is adjusted to about 10 $\mu$m, so that additional spherical aberration is not generated. Accordingly, the numerical aperture increases without increasing the optical aberration and the size of the spot is reduced. Thus, an existing optical disk such as an LD requiring a higher-density than a CD can be reproduced. For reference, a spot size of about 1.2 $\mu$m is needed to reproduce the LD, and that of about 1.4 $\mu$m is needed to reproduce the CD. A spot size of about 0.9 $\mu$m is needed to reproduce the DVD. As a result, the present invention can reproduce the various optical disks such as DVD, LD and CD, using a simple optical pickup.

Figure 10:
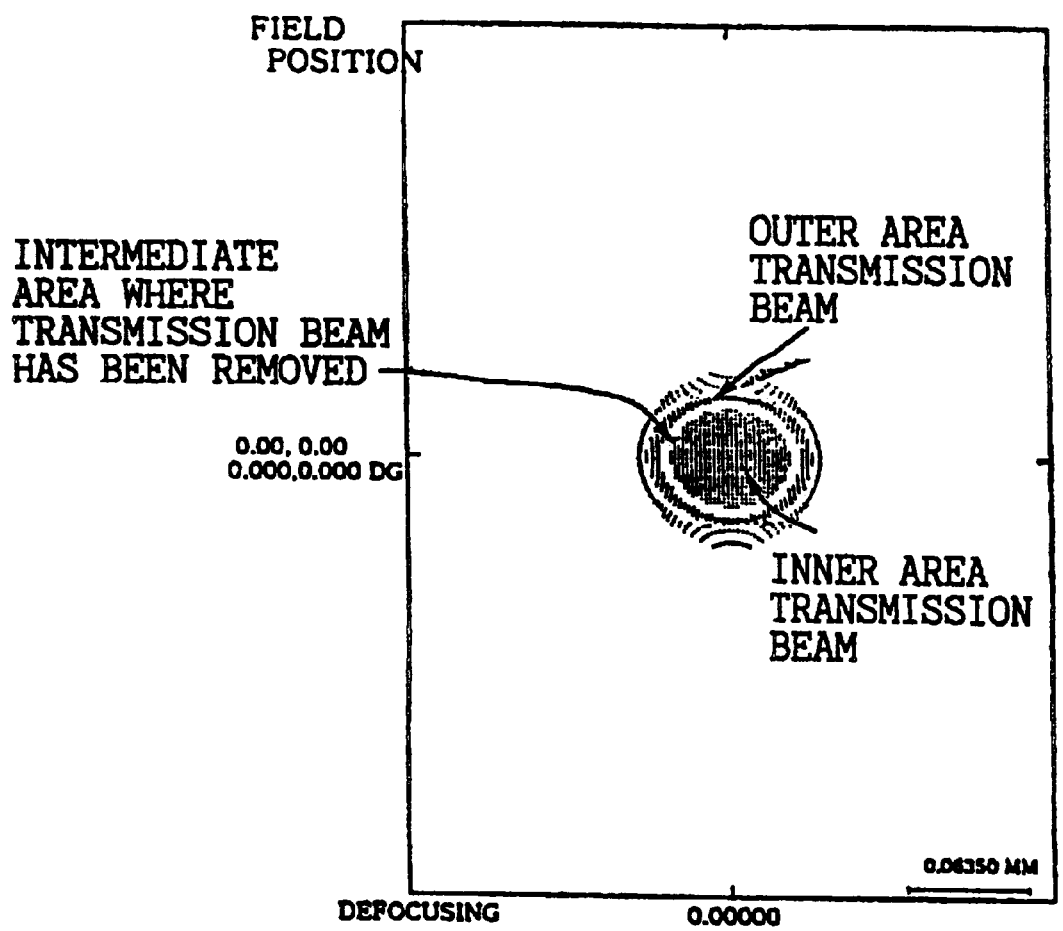
FIG. 10 shows distribution of the light beams in the light detector when a thin optical disk is read by using the optical pickup according to the first and second embodiments of the present invention.
Figure 11:
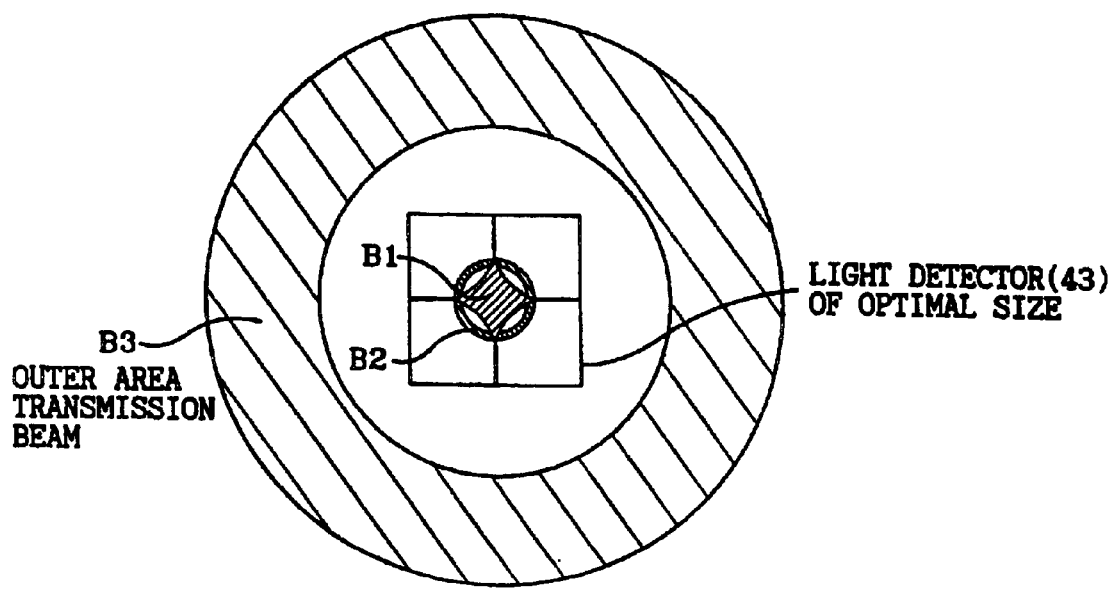
FIG. 11 shows distribution of the light beams in the light detector when a thick optical disk is read by using the objective lens according to the first and second embodiments of the present invention.

FIG. 10 shows a distribution of the light in the light detector 43 when information from a thin disk 30A is reproduced according to first and second embodiments of the present invention. In FIG. 10, dark portions are due to the light transmitted through the inner area A1 and the outer area A3 of the objective lens 20 or 20' and are detected as an efficient reproduction signal. However, bright portions between the dark portions represent that the light transmitted through the annular lens area A2 of the objective lens 20 or 20' is not detected in the light detector 43 and is not detected as an efficient reproduction signal. FIG. 11 shows distribution of the light beams in the light detector 43 when information from a thick optical disk 30B is reproduced using the objective lens 20 or 20' according to the present invention. A notation "B1" shows a distribution of the light transmitted through the inner area A1 in the light detector 43, "B2" shows a distribution of the light transmitted through the annular lens area A2, and "B3" shows a distribution of the light transmitted through the outer area A3. The light forming the B1 and B2 distributions as shown in FIG. 11 is detected as an efficient signal in the light detector 43, and the light forming the B3 distribution is not detected as an efficient reproduction signal.

Figure 7:
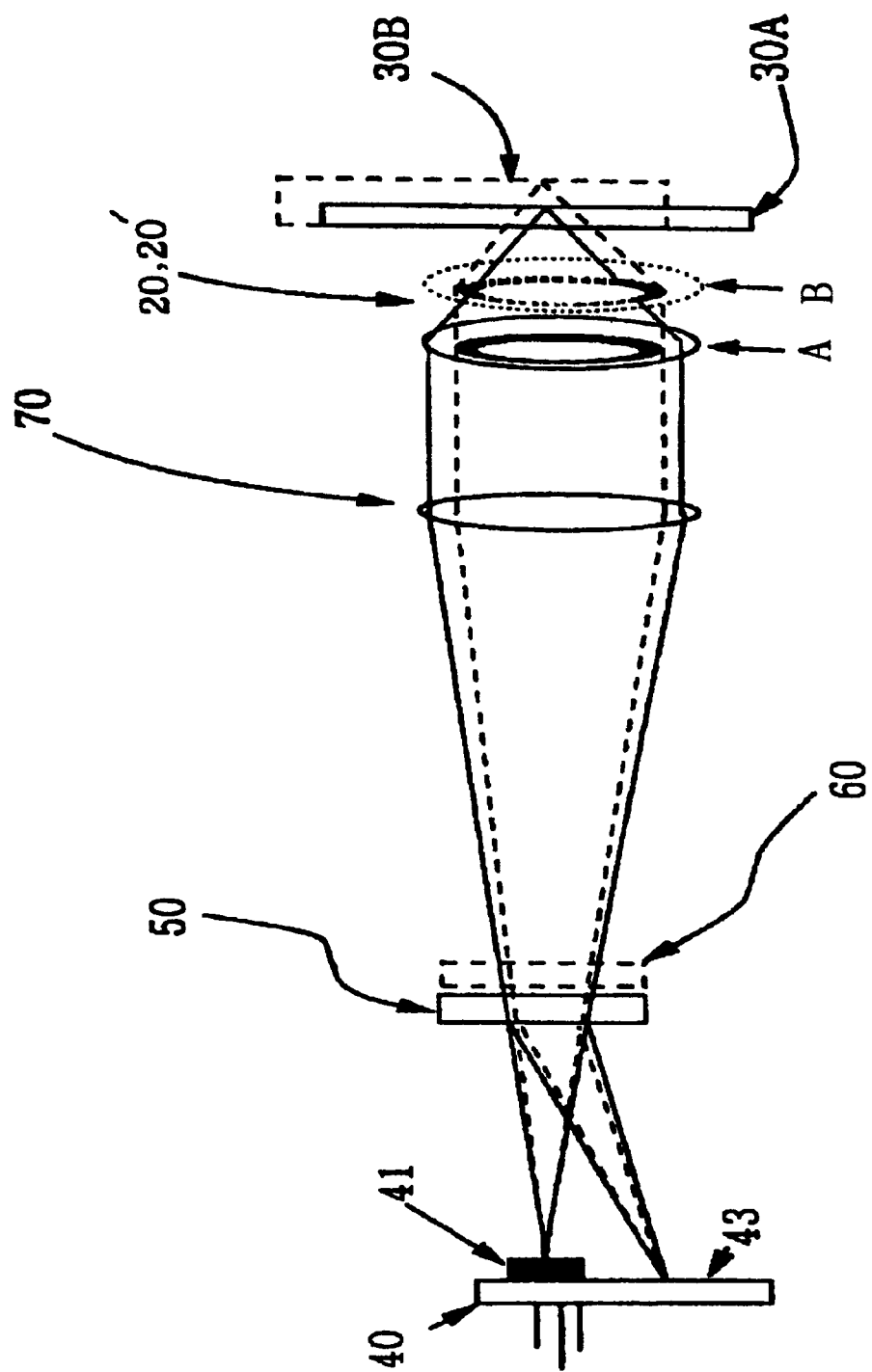
FIG. 7 shows a modification of the optical system of the optical pickup shown in FIG. 6.

FIG. 7 shows a modification of the optical system of the optical pickup shown in FIG. 6. In FIG. 7, a unit 40 includes a light source 41 and a light detector 43 which are formed in a single module. A holographic beam splitter 50 is a polarizing hologram with a high optical efficiency, and obtains a high optical efficiency by using a quarter wave plate 60. It is preferable that a polarizing hologram should be replaced by a general hologram in the case when the quarter wave plate 60 is not used. The (light) rays of 650 nm from the light source 41 are transmitted through the holographic beam splitter 50 and the quarter wave plate 60, and then become parallel rays by the collimating lens 70. The objective lens 20 or 20' focuses the light incident from the collimating lens 70 on the information recording surface 31A of the thin optical disk 30A or the information recording surface 31B of the thick optical disk 30B, in the form of an optical spot. In the optical pickup shown in FIG. 7, since the objective lens 20 or 20' is the same as that in FIG. 6, a detailed description thereof will be omitted. The light reflected from the information recording surface 31A or 31B is finally converged to be focused on the light detector 43 by the hologram beam splitter 50.

Figure 8A:
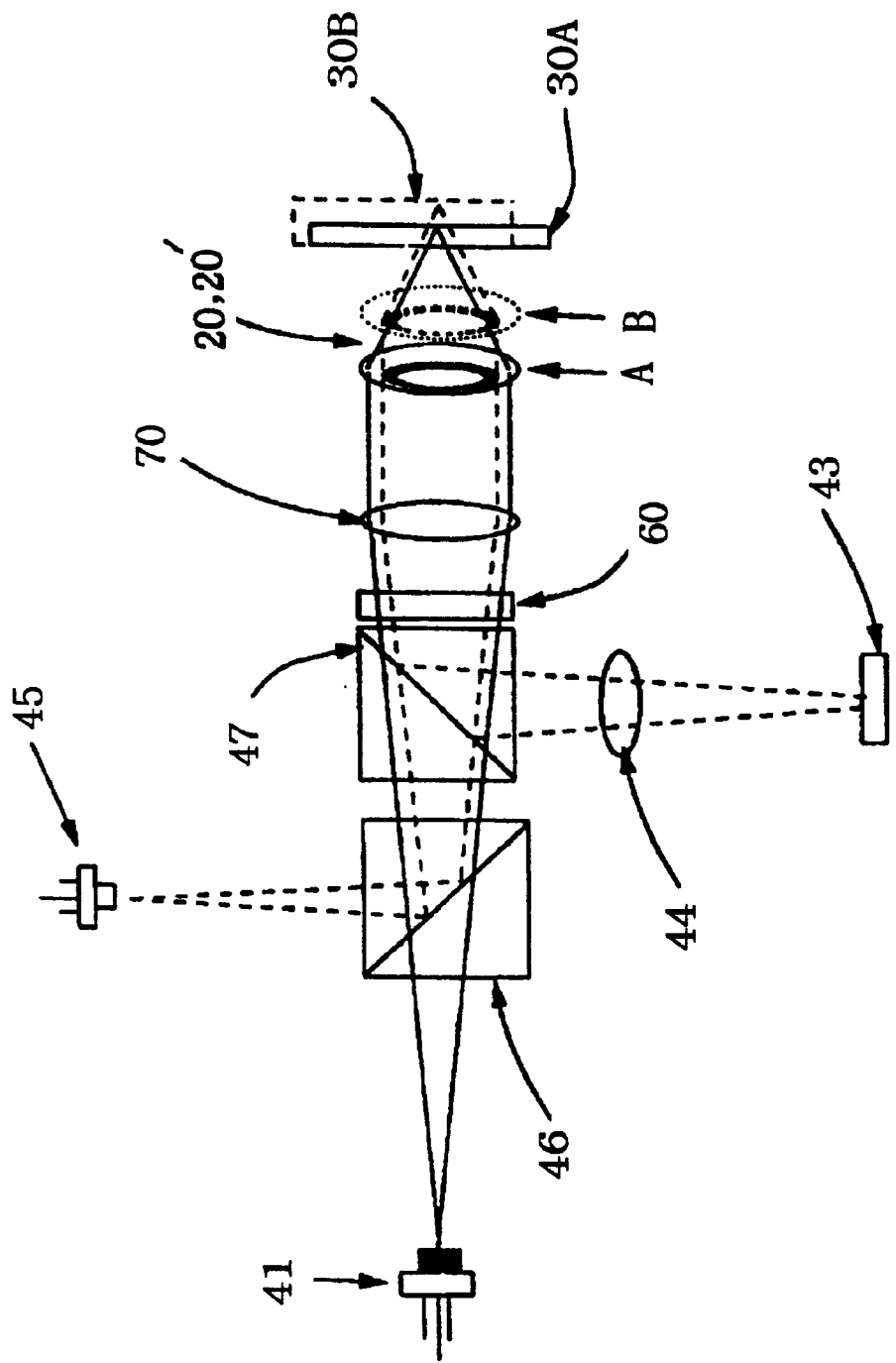
FIG. 8A shows a second type of optical pickup having an objective lens, two light sources and a single light detector according to the first and second embodiments of the present invention.

FIG. 8A shows an optical pickup having an objective lens 20 or 20', two light sources 41 and 45 and a single light detector 43 according to the first and second embodiments of the present invention. The light source 41 emits a laser beam of 650 nm and the light source 45 emits a laser beam of 780 nm. The 780 nm light source may be used for a CD, CD-RW, CD-R or LD disk, and the 650 nm light source may be used for a DVD, LD, CD or CD-RW disk. When the light source 41 is used, the emitted light rays form an optical path shown as a solid line in FIG. 8A, in which case the objective lens 20 or 20' is shown as a solid line at position A. When the light source 45 is used, the emitted light rays form an optical path shown as a dotted line, in which case the objective lens 20 or 20' is shown as a dotted line at position B. The optical spot focused on the thick optical disk 30B or the thin optical disk 30A by the objective lens 20 or 20' is the same as that shown in FIG. 6.

A beam splitter 46 is a color separable splitter, which transmits the light supplied from the light source 41 and reflects the light supplied from the light source 45. The light reflected from the beam splitter 46 is incident on a polarizing beam splitter 47. The polarizing beam splitter 47 has an optical characteristic which transmits or reflects linearly polarized beams, which operates with respect to the light of 650 nm and 780 nm wavelengths. The polarizing beam splitter 47 transmits the light incident from the beam splitter 46, and the transmitted light becomes a circularly polarized beam by a quarter wave plate 60. The circularly polarized beam is focused on the information recording surface of the thin optical disk 30A or the thick optical disk 30B by the objective lens 20 or 20'. The light reflected from the information recording surface passes through the objective lens 20 or 20' and the collimating lens 70 and then becomes linearly polarized light by the quarter wave plate 60. The linearly polarized light is reflected from the polarizing beam splitter 47 and the reflected light is focused into the light detector 43 by the light detection lens 44. The polarizing beam splitter 47 is replaced by a beam splitter which partially transmits and reflects the incident light when the quarter wave plate 60 is not used.

Figure 8B:
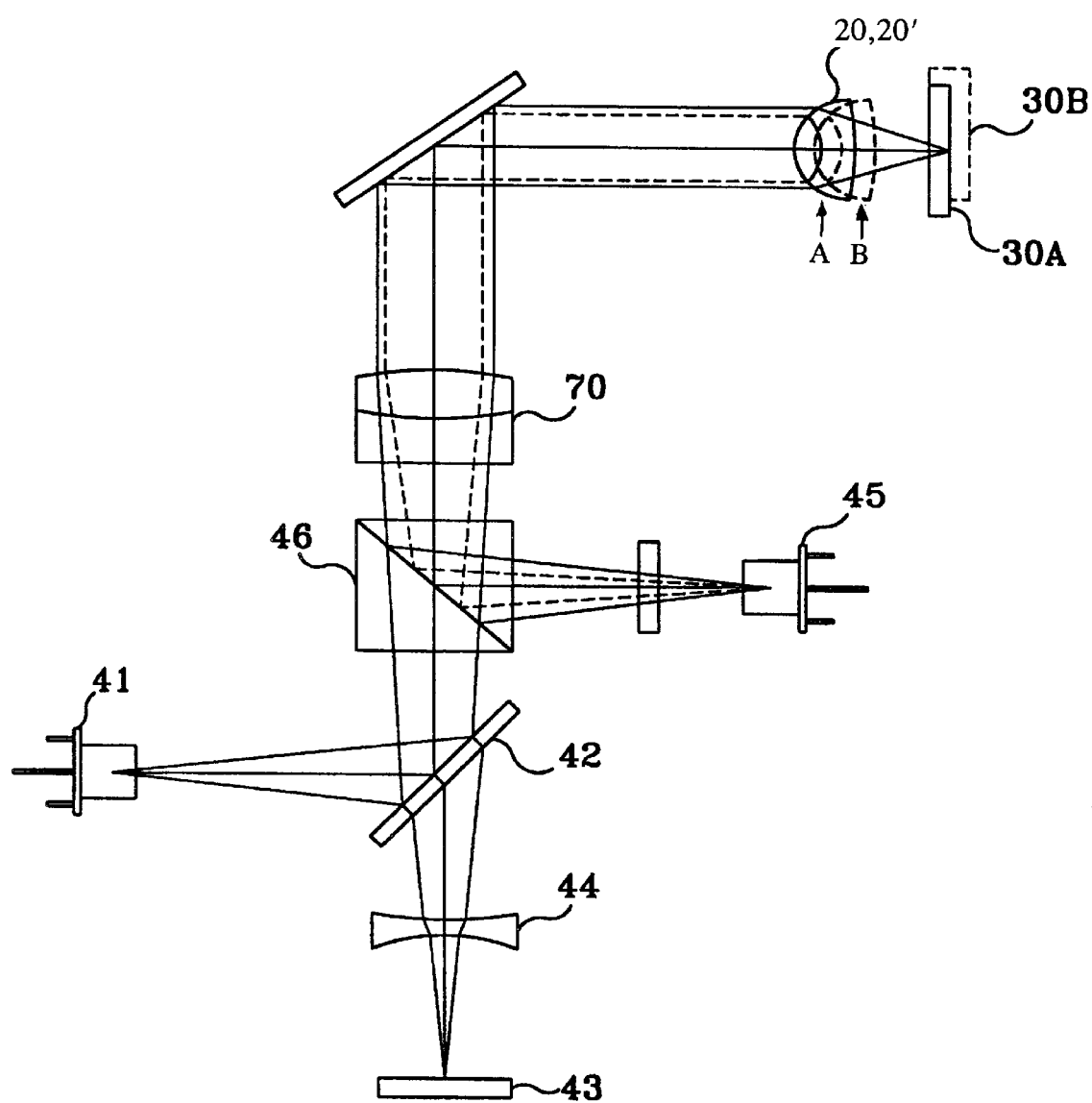
FIG. 8B shows a modification of the optical pickup shown in FIG. 8A.

An optical pickup having an objective lens, two light sources, a single light detector, and a plate-type beam splitter 42, can be used as shown in FIG. 8B. FIG. 8B shows a modification of the optical pickup shown in FIG. 8A, by replacing a cube-type beam splitter with a plate-type beam splitter. In addition, the two light sources 41 and 45 face in opposite directions relative to one another and the light detector faces at a 90° angle to the light sources 41 and 45. This is in contrast to the optical pickup shown in FIG. 8A, wherein the light sources 41 and 45 face at right angles relative to each other and that the light detector 43 faces in an opposite direction to that of the light source 45 and at a right angle to the light source 41.

Figure 9:
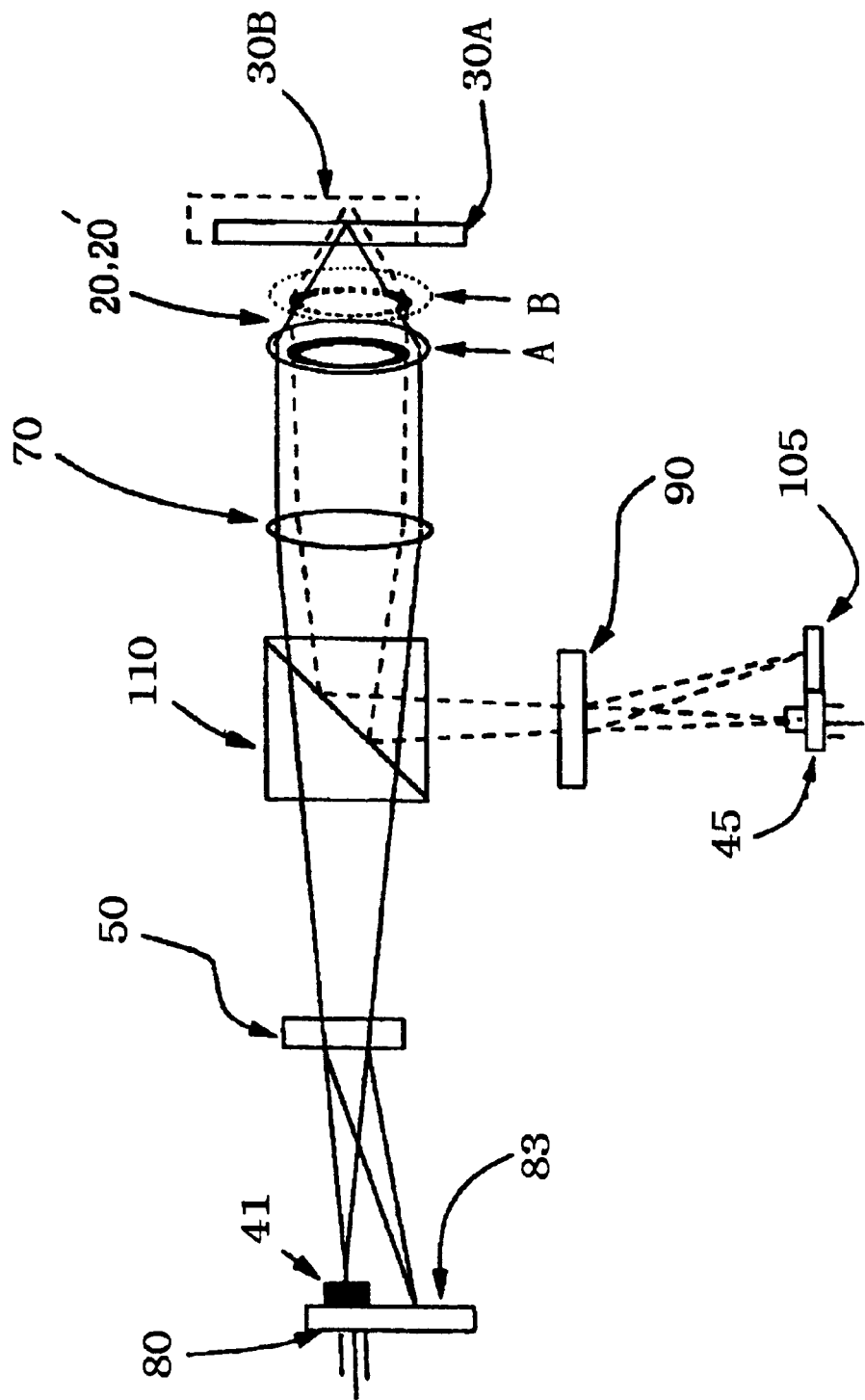
FIG. 9 shows a third type of optical pickup having an objective lens, two light sources and two light detectors according to the first and second embodiments of the present invention.

FIG. 9 shows an optical pickup having an objective lens 20 or 20', two light sources 41 and 45 and two light detectors 83 and 105 according to the first and second embodiments of the present invention. In FIG. 9, the light source 41 emits (light) rays having a wavelength of 650 nm and, the light detector 83 corresponds to the light source 41. Reference numerals 45 and 105 are a light source and a light detector, respectively, for 780 nm wavelength light, and 90 and 110 are beam splitters. Other optical elements are the same as those shown in FIGS. 8A and 8B. The light beam emitted from the light source 45 is transmitted through the beam splitter 90. The beam splitter 90 divides light reflected from the optical disk 30B and transmits the divided light toward the photodetector 105. Since the optical pickup system shown in FIG. 9 can be understood by a person skilled in the art based on the description provided regarding FIGS. 8A and 8B, a detailed description thereof will be omitted.

Up to now, the objective lens according to the present invention has been described with reference to the optical pickup. However, it is apparent to one having an ordinary skill in the art that the objective lens according to the present invention can be applied to a microscope or an optical pickup estimating apparatus.

As described above, the optical pickup according to the present invention is compatible with disks having various different formats irrespective of the thickness or recording density of the disk, and an excellent reading signal can be obtained from the used disk. Also, the objective lens according to the present invention can be manufactured at low cost by using an injection molding. Particularly, when two or more wavelengths are used for optical disk compatibility, an optical pickup can be made using a single objective lens and a single light detector.

While only certain embodiments of the invention have been specifically described herein, it will be apparent that numerous modifications may be made thereto without departing from the spirit and scope of the invention.

What is claimed is:

1. An optical pickup device in an optical device and which reads information from an optical recording medium, the optical pickup device comprising:
    a first light source to emit a first light;
    a second light source to emit a second light, wherein only one of the first and second light sources emits the first and second lights, respectively, at a given time;
    an objective lens, having an inner region, and first and second regions different from each other, to receive the one of the first and second lights emitted from the corresponding one of the first and second light sources, and to focus the one of the first and second lights emitted toward the optical recording medium and pass light reflected from the optical recording medium; and
    a photo detector to receive the first light passed through the inner and second regions and reflected from the optical recording medium and to receive the second light passed through the inner and first regions and reflected from the optical recording medium, to reproduce the information.

2. The optical pickup device as claimed in claim 1, wherein the first light source emits the first light if the optical recording medium has a first thickness and the second light source emits the second light if the optical recording medium has a second thickness greater than the first thickness.

3. The optical pickup device as claimed in claim 1, wherein the first light has a first frequency and the second light has a second frequency different from the first frequency.

4. The optical pickup device as claimed in claim 2, wherein the first light has a first frequency and the second light has a second frequency different from the first frequency.

5. The optical pickup device as claimed in claim 1, wherein the objective lens is a single lens.

6. The optical pickup device as claimed in claim 1, further comprising:
    a first beam splitter to transmit the first light from the first light source and to reflect the second light from the second light source;
    a second beam splitter to transmit the first light transmitted through the first beam splitter and the second light reflected by the first beam splitter; and
    a collimating lens to collimate the first light and reflected second light transmitted through the second beam splitter, and transmit the collimated light to the objective lens;

wherein the second beam splitter reflects the first and second lights reflected from the optical recording medium.

7. The optical pickup device as claimed in claim 1, further comprising:
a first beam splitter to reflect the first light from the first light source;
a second beam splitter to transmit the first light reflected by the first beam splitter and reflect the second light reflected by the first beam splitter; and
a collimating lens to collimate the first light and reflected second light transmitted through the second beam splitter, and transmit the collimated light toward the objective lens;
wherein the first and second beam splitters transmit the first and second lights reflected from the optical recording medium to the photo detector.

8. An optical pickup device in an optical device and which reads information from an optical recording medium, the optical pickup device comprising:
a first light source to emit a first light;
a second light source to emit a second light, wherein only one of the first and second light sources emits the first and second lights, respectively, at a given time;
an objective lens, having an inner region, and first and second regions different from each other, to receive the one of the first and second lights emitted from the corresponding one of the first and second light sources, and to focus the one of the first and second lights emitted toward the optical recording medium and pass light reflected from the optical recording medium; and
a photo detector to receive the first light passed through the inner and second regions and reflected from the optical recording medium and to receive the second light passed through the inner and first regions and reflected from the optical recording medium, to reproduce the information;
wherein the objective lens includes a light passing region divided into inner, annular lens and outer regions, wherein curvatures of the central and periphery regions are optimized for the optical recording medium if the optical recording medium has a first thickness and a curvature of the annular region is optimized for the optical recording medium if the optical recording medium has a second thickness greater than the first thickness.

9. The optical pickup device as claimed in claim 8, wherein a surface of the annular lens area forms a step difference with a surface of one of the inner and outer areas.

10. The optical pickup device as claimed in claim 9, further comprising:
a first beam splitter to transmit the first light from the first light source and to reflect the second light from the second light source;
a second beam splitter to transmit the first light transmitted through the first beam splitter and the second light reflected by the first beam splitter; and
a collimating lens to collimate the first light and reflected second light transmitted through the second beam splitter, and transmit the collimated light to the objective lens;
wherein the second beam splitter reflects the first and second lights reflected from the optical recording medium.

11. The optical pickup device as claimed in claim 9, further comprising:

a first beam splitter to reflect the first light from the first light source;
a second beam splitter to transmit the first light reflected by the first beam splitter and reflect the second light reflected by the first beam splitter; and
a collimating lens to collimate the first light and reflected second light transmitted through the second beam splitter, and transmit the collimated light toward the objective lens;
wherein the first and second beam splitters transmit the first and second lights reflected from the optical recording medium.

12. An optical pickup device in an optical device and which reads information from an optical recording medium, the optical pickup device comprising:
a first light source to emit a first light;
a second light source to emit a second light, wherein only one of the first and second light sources emits the first and second lights, respectively, at a given time;
an objective lens, having an inner region, and first and second regions different from each other, to receive the one of the first and second lights emitted from the corresponding one of the first and second light sources, and to focus the one of the first and second lights emitted toward the optical recording medium and pass light reflected from the optical recording medium; and
a photo detector to receive the first light passed through the inner and second regions and reflected from the optical recording medium and to receive the second light passed through the inner and first regions and reflected from the optical recording medium to reproduce the information;
wherein the first light source emits the first light if the optical recording medium has a first thickness and the second light source emits the second light if the optical recording medium has a second thickness greater than the first thickness;
wherein the objective lens includes a light passing region divided into inner, annular lens and outer regions, wherein curvatures of the central and periphery regions are optimized for the optical recording medium if the optical recording medium has the first thickness and a curvature of the annular region is optimized for the optical recording medium if the optical recording medium has the second thickness.

13. The optical pickup device as claimed in claim 12, wherein a surface of the annular lens area forms a step difference with a surface of one of the inner and outer areas.

14. An optical pickup device in an optical device and which reads information from an optical recording medium, the optical pickup device comprising:
a first light source to emit a first light;
a second light source to emit a second light, wherein only one of the first and second light sources emits the first and second lights, respectively, at a given time;
an objective lens, having an inner region, and first and second regions different from each other, to receive the one of the first and second lights emitted from the corresponding one of the first and second light sources, and to focus the one of the first and second lights emitted toward the optical recording medium and pass light reflected from the optical recording medium;
a first photo detector to receive the first light passed through the inner and second regions and reflected from the optical recording medium, to reproduce the information; and a second photo detector to receive the second light passed through the inner and first regions and reflected from the optical recording medium, to reproduce the information.

15. The optical pickup device as claimed in claim 14, wherein the first light source emits the first light if the optical recording medium has a first thickness and the second light source emits the second light if the optical recording medium has a second thickness greater than the first thickness.

16. The optical pickup device as claimed in claim 15, wherein the first light has a first frequency and the second light has a second frequency different from the first frequency.

17. An optical pickup device in an optical device and which reads information from an optical recording medium, the optical pickup device comprising:

a first light source to emit a first light;

a second light source to emit a second light, wherein only one of the first and second light sources emits the first and second lights, respectively, at a given time;

an objective lens, having an inner region, and first and second regions different from each other, to receive the one of the first and second lights emitted from the corresponding one of the first and second light sources, and to focus the one of the first and second lights emitted toward the optical recording medium and pass light reflected from the optical recording medium;

a first photo detector to receive the first light passed through the inner and second regions and reflected from the optical recording medium, to reproduce the information; and a second photo detector to receive the second light passed through the inner and first regions and reflected from the optical recording medium, to reproduce the information;

wherein the objective lens includes a light passing region divided into inner, annular lens and outer regions, wherein curvatures of the central and periphery regions are optimized for the optical recording medium if the optical recording medium has a first thickness and a curvature of the annular region is optimized for the optical recording medium if the optical recording medium has a second thickness greater than the first thickness.

18. The optical pickup as claimed in claim 17, wherein a surface of the annular lens area forms a step difference with a surface of one of the inner and outer areas.

19. The optical pickup as claimed in claim 18, further comprising:

a beam splitter to transmit the first light from the first light source and to reflect the second light from the second light source; and a collimating lens to collimate the first light transmitted through the beam splitter and the second light reflected by the second beam splitter, and transmit the collimated light to the objective lens;

wherein the beam splitter transmits the first light reflected from the optical recording medium to the first photo detector and reflects the second light reflected from the optical recording medium to the second photo detector.

* * * * *